United States Patent

[11] 3,597,583

| [72] | Inventor | Hans Joachim Hulsewig<br>Dusseldorf, Germany |
|---|---|---|
| [21] | Appl. No. | 851,262 |
| [22] | Filed | Aug. 19, 1969 |
| [45] | Patented | Aug. 3, 1971 |
| [73] | Assignee | Duria-Werk Karl Kempf G.m.b.H.<br>Neuss Rhine, Germany |
| [32] | Priority | Sept. 12, 1968 |
| [33] | | Germany |
| [31] | | P 17 58 989.8 |

[54] CONSUMABLE WELDING ELECTRODE
8 Claims, 2 Drawing Figs.

[52] U.S. Cl. ..................... 219/146
[51] Int. Cl. ..................... B23k 35/22
[50] Field of Search ........... 219/145, 146; 148/23, 24, 26; 117/202, 203, 204, 205, 206, 207

[56] References Cited
UNITED STATES PATENTS

| 1,893,160 | 1/1933 | Clarke | 117/206 |
| 2,632,835 | 3/1953 | Wasserman | 148/24 |
| 3,102,827 | 9/1963 | Kriewall et al. | 117/204 |
| 3,211,582 | 10/1965 | Wasserman et al. | 117/205 |

*Primary Examiner*—J. V. Truhe
*Assistant Examiner*—Lawrence A. Rouse
*Attorney*—Toren & McGeady ABSTRACT: A consumable welding electrode for making welded joints which are resistant to rusting, acid attack and heat comprises a core rod which contains alloy-producing components and a sheath which contains both alloy-producing components and flux-producing components. The proportions of the alloy-producing components in the sheath and those in the core rod are such that when the electrode is used, the core rod and the sheath deposit alloys which have substantially the same compositions. To achieve this effect, the proportions of the alloy components in the sheath must be adjusted relatively to those in the core rod to allow for the fact that the sheath is consumed more rapidly than the core rod as it is made of powdered components whereas the core rod is of solid metal. With the constituents of the core rod and of the sheath adjusted in this way, the weld produced by the electrode will have a uniform composition so that no underalloyed corrosion-sensitive spots can occur.

PATENTED AUG 3 1971  3,597,583

INVENTOR
HANS JOACHIM HÜLSEWIG
BY McGlew and Toren
ATTORNEYS

CONSUMABLE WELDING ELECTRODE

BACKGROUND INFORMATION AND PRIOR ART

In order to produce welded joints which are resistent to rusting, acid attack and heat, consumable welding electrodes are used, the core rods of which consist of an alloy which is the same or similar to the alloy of which the workpiece being welded is made. The sheath of the welding rod has a lime base or a rutile acid base, and contains small quantities of ferroalloy or metal powders, for compensating the rate of consumption. Welding electrodes of this kind are known as core-stabilized welding electrodes.

For electric arc welding of highly alloyed materials alloy sheath electrodes are also used and these are sometimes known as high-speed electrodes, because they provide a high rate of melting. These electrodes have a core rod of unalloyed steel surrounded by a very thick sheath. The sheath consists of metal powders, such as for example ferrochrome, chromium powder, nickel powder, ferromolybdenum, ferroniobium-tantalum, calcite, fluorspar, silicates and the like.

However alloy sheath electrodes of this kind can produce corrosion-sensitive spots in the weld. This happens when the electrode sheath has become damaged, for example during transport or during handling. A part of the sheath may be broken away. If this happens, then during the welding operation a false alloy is produced at some locations in the weld.

SUMMARY OF INVENTION

The object of the present invention is to provide a consumable welding electrode which is capable of producing welded points which are resistent to rusting, to acid attack and to heat and which retains the superior welding properties and the high rate of melt production of alloy sheath electrodes while satisfying the most stringent demands with regard to the corrosion resistance of the welded joints produced.

To this end, according to this invention, such an electrode comprises a core rod which contains alloy-producing components and a sheath which contains alloy-producing components and flux-producing components wherein the proportions of the alloy-producing components in the sheath and those in the core rod are such that when the electrode is used, the sheath being consumed faster than the core rod, the core rod and the sheath deposit alloys which have substantially the same compositions.

To obtain this it is necessary to allow for the fact that the powdered metal alloy components of the sheath are consumed more rapidly than the solid metal components of the core rod.

Thus the proportions of the alloy components in the sheath are equivalent to the proportions in the core rod, due allowance being made for the different rates of consumption. To allow for the fact that a powder is consumed at a faster rate than solid metal, the sheath contains an excess of the alloy components which are easily oxidized, for example chromium. A welding electrode constructed in this way always produces a corrosion-resistant welded joint, even if the sheath has been damaged, or if pieces of the sheath are missing at the beginning of the welding operation or become missing during the welding processes. If a piece of the sheath is missing, all that happens is that an equivalent quantity of the core rod flows into the joint, the material of the core rod containing equivalent proportions of the alloy components, that is to say proportions which result in the same alloy in the weld as would occur there if no piece were missing from the sheath. No corrosion-sensitive spots can therefore occur in the welded joint.

Welding electrodes in accordance with the invention provide an output just as high as that provided by conventional alloy sheath electrodes. The welding yield can easily be as high as 140 percent to 200 percent. By welding yield is meant the ratio of the mass of molten metal forming the joint, to the mass lost by the electrode core.

The core rod may be an austenitic steel containing from 17 percent to 20 percent chromium and from 8 percent to 14 percent nickel by weight, and the sheath then also contains chromium, nickel and iron in the appropriate proportions. If desired the core rod can also contain up to 5 percent molybdenum and/or from 0 percent to 1 percent niobium-tantalum by weight. The sheath then also, of course, contains molybdenum and/or niobium-tantalum.

In order to obtain the welding yield mentioned above it has been found preferable to make the diameter of the sheath from two to two and a half times the diameter of the core. The sheath may contain from 10 percent to 30 percent of ferrochromium, from 0 percent to 15 percent nickel powder, from 20 percent to 40 percent iron powder, from 0 percent to 5 percent ferromanganese, from 0 percent to 10 percent ferromolybdenum, from 0 percent to 3 percent ferroniobium-tantalum, from 10 percent to 20 percent titanium dioxide, from 2 percent to 10 percent calcium carbonate, from 0 percent to 10 percent fluorspar, from 7 percent to 22 percent silicate by weight and a binder.

An example of an electrode constructed in accordance with the invention will now be described in greater detail with reference to the accompanying drawings in which.

Figure 1:
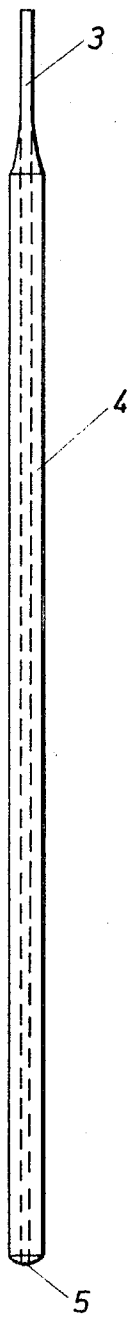
FIG. 1 is a side view of the electrode.
Figure 2:
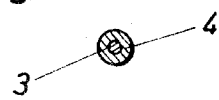
FIG. 2 is a cross section through the electrode.

The electrode comprises a core rod 3 in a surrounding sheath 4. In order to initiate the arc-welding processes, that is to say to ignite the arc, a good electric contact must be made between the workpiece and a lower or ignition end 5 of the core rod 3. For this purpose, the ignition end 5 of the core rod is exposed, that is to say the sheath 4 is rounded off at this end of the welding electrode. When a welding electrode of this kind is in operation, it is not possible to produce underalloyed regions in the welded joint. This can neither occur due to the rounded off end of the electrode, nor due to pieces having broken away from the sheath. No part of the welded joint can therefore be sensitive to corrosion. In order to prevent corrosion-sensitive spots from occuring in the welded joint, while nevertheless obtaining a high yield from the electrode, the core rod and the sheath have alloy components in the required equivalent proportions taking into consideration the different rates of consumption of the core rod and sheath, to the effect that the material of the completed weld always consists of the desired alloy, even if the sheath of the electrode has been damaged.

As an example, for a particular field of application, the core rod 3 has the following composition in percentages by weights:

0 percent—0.10 percent carbon
17 percent to 22 percent chromium
8 percent to 14 percent nickel
0 percent to 5 percent molybdenum
0 percent to 1 percent niobium-tantalum
and the remainder iron.

The material of the weld may for example have one of the two following compositions in percentages by weight:

| | | |
|---|---|---|
| 0.05% carbon | | 0.05% carbon |
| 19% chromium | | 19% chromium |
| 10% nickel | or | 12% nickel |
| 0.6% niobium-tantalum | | 2.7% molybdenum |
| | | 0.6% niobium-tantalum |
| the remainder iron | | the remainder iron |

The electrode provides a high yield of from 140 percent to 200 percent. The yield can be modified by changing the composition of the sheath 4. For example to provide a yield of 150 percent, and with a core rod diameter of 3.25 mm., the sheath 4 should have an outside diameter of 6.70 mm., and may have the following composition in percentages by weight:

20% ferrochromium
5% nickel
32% iron
3% ferromanganese
15% titanium dioxide

5% calcium carbonate
4% fluorspar
15% silicate
1% binder

To form the sheath the constituents in powdered form are mixed together and are then compressed onto the core rod 3 in the conventional manner using a binder which is for example potassium or sodium waterglass.

I claim:

1. In a consumable welding electrode for making welded joints which are resistant to rusting, acid attack and heat, wherein said electrode comprises a core rod and a sheath surrounding said core rod, said core rod containing alloy-producing components and said sheath containing alloy-producing components and flux-producing components, the improvement which comprises that said alloy-producing components in said sheath and said alloy-producing components in said core rod are present in such proportions relative to each other that—considering the different consumption rates of the alloy-producing components in said sheath and said core rod—when said electrode is used and said sheath and said core rod are consumed, said core rod and said sheath deposit alloys which have substantially the same compositions.

2. An electrode as claimed in claim 1, wherein said core rod comprises an austenitic steel including from about 17 percent to 20 percent chromium and from about 8 percent to about 14 percent nickel by weight and said sheath also includes chromium, nickel and iron.

3. An electrode as claimed in claim 2, wherein said core rod also includes up to about 5 percent molybdenum and up to about 1 percent niobium-tantalum by weight and said sheath also includes components selected from the group consisting of molybdenum and niobium-tantalum.

4. An electrode as claimed in claim 1, wherein said core rod and said sheath are cylindrical, said sheath having an outside diameter from about two to about two and a half times greater than that of said core rod.

5. An electrode as claimed in claim 1, wherein said sheath includes from about 10 percent to about 30 percent ferrochromium, up to about 15 percent nickel powder, from about 20 percent to about 40 percent iron powder, from 0 percent to about 5 percent ferromanganese, from 0 percent to about 10 percent ferromolybdenum, from 0 percent to about 3 percent ferroniobium-tantalum, from about 10 percent to about 20 percent titanium dioxide, from about 2 percent to about 10 percent calcium carbonate, from 0 percent to about 10 percent fluorspar, from about 7 percent to about 22 percent silicate by weight and a binder.

6. In a consumable welding electrode for making welded joints which are resistant to rusting, acid attack and heat, wherein said electrode comprises a core rod and a sheath surrounding said core rod, said core rod containing alloy-producing components and said sheath containing alloy-producing components and flux-producing components, the improvement which comprises that said sheath is made of powdered material while said core rod is a solid body, said sheath and said core rod containing substantially the same alloy-producing components, the relative proportions of said alloy-producing components in said sheath and said core rod being adapted to the different consumption rates of said powder-containing sheath and said solid core rod body so that said sheath and said core rod body upon consumption deposit alloys that have substantially the same composition.

7. An electrode as claimed in claim 6, wherein said alloy-producing components comprise at least one metal that is easily oxidized under the conditions of welding, said sheath containing a larger proportion of said metal than said core rod to allow for a faster consumption rate of said sheath.

8. An electrode as claimed in claim 7, wherein said metal is chromium.